Figure 1:
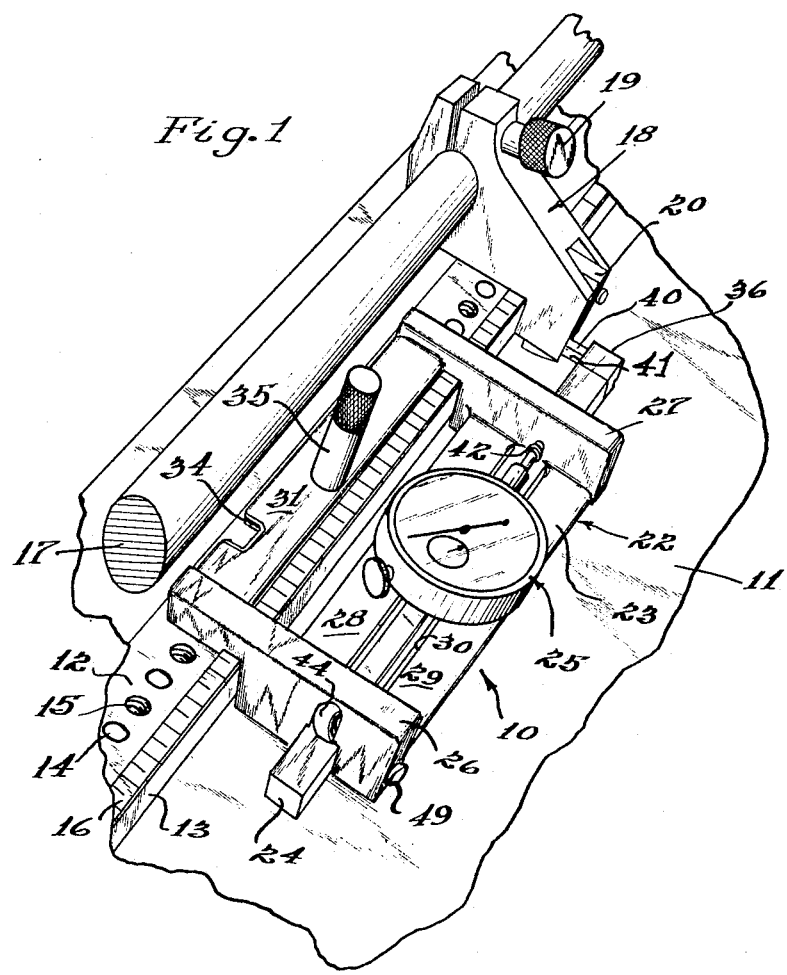

Sept. 27, 1966 A. K. SCHOTT 3,274,689
GAGING APPARATUS FOR A MACHINE TOOL
Filed April 1, 1963 2 Sheets-Sheet 1

INVENTOR.
Arthur K. Schott
BY
Hill, Sherman, Meroni, Gross & Simpson
ATTORNEYS

Sept. 27, 1966    A. K. SCHOTT    3,274,689
GAGING APPARATUS FOR A MACHINE TOOL
Filed April 1, 1963    2 Sheets-Sheet 2

INVENTOR.
Arthur K. Schott
BY
Hill, Sherman, Meroni, Gross & Simpson
ATTORNEYS

United States Patent Office 3,274,689
Patented Sept. 27, 1966

3,274,689
GAGING APPARATUS FOR A MACHINE TOOL
Arthur K. Schott, Clarence, N.Y., assignor to Houdaille Industries, Inc., Buffalo, N.Y., a corporation of Michigan
Filed Apr. 1, 1963, Ser. No. 269,461
9 Claims. (Cl. 33—125)

This invention relates generally to machine tools, and more specifically to adjustable gaging means adapted to be secured to the machine tool, and having at least one reference surface for engagement by the part to be located.

Although the principles of the present invention may be included in various machine tools, a particularly useful application is made in a punching machine of the type having a horizontal table on which a workpiece or workpiece-part is successively disposed in a number of positions, so that the machine tool operation may be carried out on the workpiece in each of such successive positions. When the machine tool comprises a press, a typical operation consists of providing or punching a hole in the workpiece. Dimensions are normally given from the center of a prospective hole to a reference edge of the workpiece.

In prior structures utilized for such purpose, stops have been provided which are adjustably set so that the workpiece may successively engage the various stops for various operations. I have found that gaging structure previously supplied to set such workpiece stops does so in a manner in which any play or clearance present is not compensated for by the apparatus used to set the same, thereby introducing a variable error in the relative location of the machining operations on the workpiece. Moreover, prior structures have employed more than one assembly or unit to effect the setting of such workpiece-locating stop, thereby necessitating the handling of a plurality of elements.

The present invention contemplates the provision of a single assembly for use in positioning a workpiece-locating stop, such assembly being also useable as a workpiece-locating stop. Further, by the present invention, each workpiece-locating stop is laterally biased during its setting so as to take up any clearance or play in the direction that the workpiece or workpiece-part will subsequently engage such stop.

Accordingly, it is an object of the present invention to provide an improved gaging apparatus for a machine tool.

Another object of the present invention is to provide a gaging apparatus of the type described which comprises a single or unitary assembly.

A still further object of the present invention is to provide stop-setting means by which any clearance or play therein is taken up during the setting thereof, such play being taken up in the direction that the workpiece will subsequently engage such work-stop, thereby to cancel any error that such play might otherwise introduce.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

Figure 4:
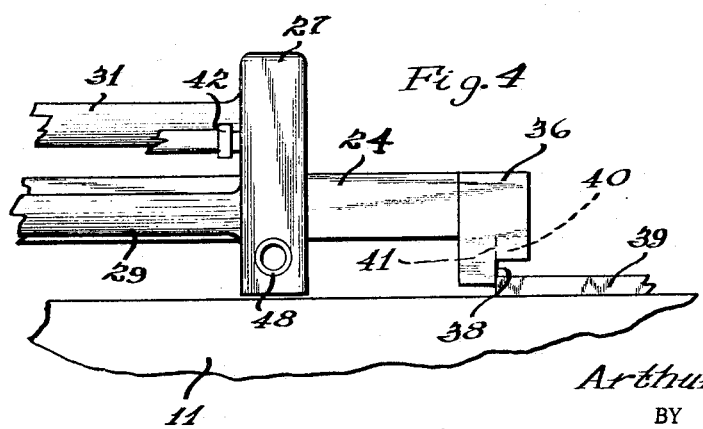
Figure 2:
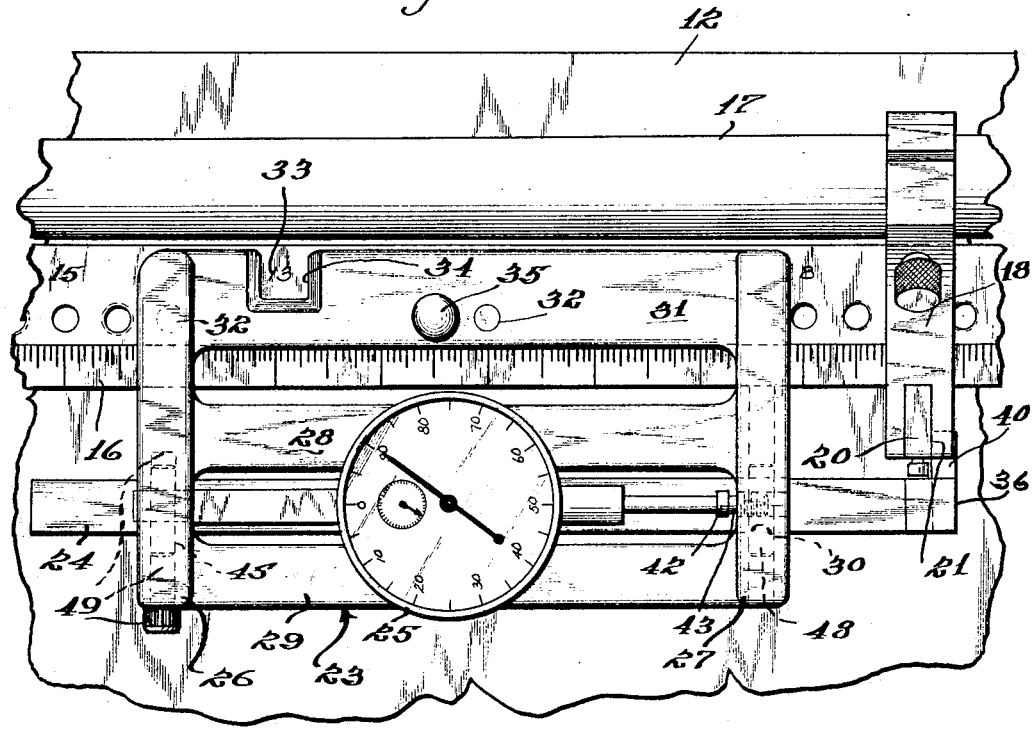
Figure 3:
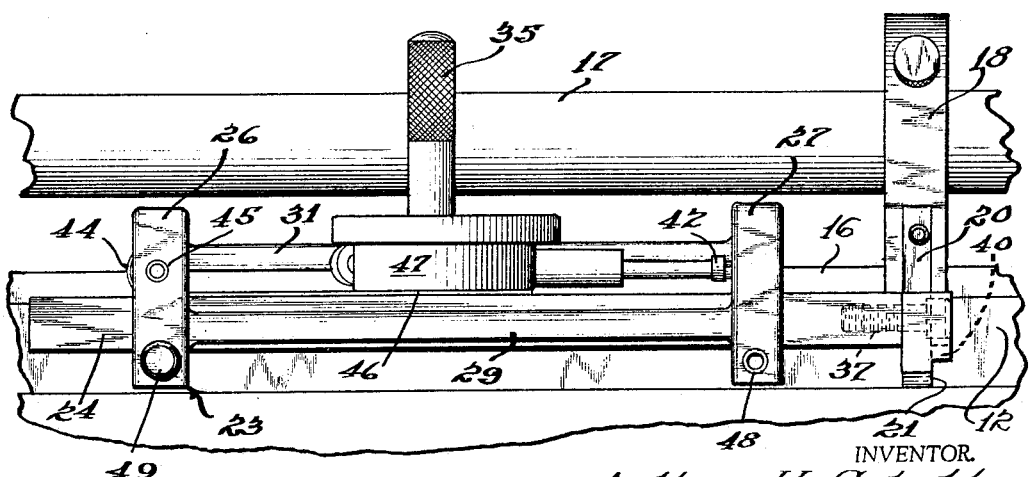

On the drawings:
FIGURE 1 is a perspective view of a gaging apparatus for a machine tool constructed in accordance with the principles of the present invention;
FIGURE 2 is an enlarged top plan view of the structure shown in FIGURE 1;
FIGURE 3 is a front elevational view of the structure shown in FIGURE 1; and
FIGURE 4 is a fragmentary front elevational view representing a portion of FIGURE 3, but showing the gaging apparatus used in conjunction with a workpiece.

As shown on the drawings:
The principles of this invention are particularly useful when embodied in a positioning structure such as illustrated in FIGURE 1, generally indicated by the numeral 10. The positioning structure 10 is particularly useful when associated with a machine tool having a horizontal table 11 on which the workpiece is supported for horizontal movement relative to a vertical operational axis during machining thereof. The intersection of the operational axis of such machine tool with a horizontal plane of movement of the work is referred to herein as a reference point, which can be any point disposed in fixed relation to the table 11.

The positioning structure 10 includes an elongated rigid means or back-gage bar 12 which is slidably supported by means (not shown) to be moved in a direction perpendicular to its length. The forward face 13 thereof comprises a reference surface against which one edge of a workpiece is located. The present invention deals with locating an adjacent edge in a direction parallel to the direction in which the length of the surface 13 or rigid means 12 extends. To that end, the elongated rigid means 12 is provided with a series of aligned locating holes 14 disposed along the length thereof, a series of spaced threaded holes 15 associated with the locating holes 14, a graduated scale 16 secured to the elongated rigid means 12, and a rigid rail bar 17 secured to the elongated rigid means 12 at its ends (not shown) in a known manner. The rigid rail bar 17 extends parallel to the rigid means 12, and lies in spaced relation thereto. Slidably carried on the rigid rail bar 17 is a workpiece-locating stop generally indicated at 18 which has a body which is adapted to be clamped at any selected position along the length of the rigid rail bar 17 to such rigid rail bar 17 by operation of a thumbscrew 19. The workpiece-locating stop 18 includes a movable finger or finger part 20, movably guided by the body of the locating stop 18, the finger 20 having a surface 21, the lower end of which is a reference surface against which a workpiece is brought to bear for location of such workpiece. The reference surface 21 lies in a plane which is spaced from the reference point of the machine tool by a distance which is indicated by the scale 16, and which more specifically is indicated by the intersection of the plane of the surface 21 or the right side of the stop 18 with the graduations on each scale 16. For non-precision work, the scale 16 may be employed to position the workpiece stop 18 in an approximate manner. However, the present invention deals with the apparatus for positioning the workpiece-locating stop 18 in a somewhat more precise manner.

To that end there is provided an assembly generally indicated at 22 which includes a holder 23 which guides a movable slide bar 24 on which there is carried a direct reading gage or dial indicator 25.

The holder 23 preferably comprises a casting which includes a pair of end portions 26, 27 disposed in spaced parallel relation to each other, having lower ends which may engage the upper surface of the table 11, and which are joined together by a pair of webs 28, 29 which jointly define a channel 30 therebetween. The ends of the channel 30 in the end portions 26, 27 are sized to provide guidance for the slide bar 24, which is movable endwise therein. The holder ends 26, 27 extend rearwardly in overhanging relation to the rigid means 12, such overhanging ends being joined together by a further web or masking portion 31. The overhanging or masking portion 31 supports at least one downwardly directed locating plug 32 (FIGURE 2) which depends therefrom and is selectably received in any one of the several locating holes 14. The holes 14 are spaced from each other, preferably uniformly, at increments of one unit of length, such as 1-inch increments, whereby the holder 23 may be disposed successively with respect to the rigid means 12 at 1-inch increments therealong. Each of the locating holes 14 is located to the left of the reference point of the machine tool by an amount which is in excess of the value of the scale graduations adjacent to the surface 21, and each of the locating holes 14 is assigned a value which appears on the rigid means 12 in the form of indicia 33 disposed still further to the left. When the slide bar 24 is moved to the left from that shown in the drawings to a position representing a basic position, described below, a reference surface, described below, on the slide bar 24 is adjacent to a principal graduaiton on the scale 16, the value of which is employed as the index 33 for the locating hole 14 in which the locating plug 32 is then received.

The overhanging portion or web 31 masks a plurality of the indicia 33, and is cut away as indicated at 34 to provide a window in which the appropriate indicium 33 is exposed.

The overlying and masking portion 31 of the holder 23 receives a thumbscrew or retaining screw 35 which passes therethrough and into one of the spaced threaded holes 15 to clamp the assembly 22 against the elongated rigid means 12.

The slide bar 24 is of generally square cross-section and has a length such that both its ends extend beyond the ends of the holder 23. On the right end of the slide bar 24, there is a block 36 which is secured thereto as by a screw 37. The block 36 has a first reference surface 38 (FIGURE 4) which faces right, which direction is toward the reference point, and against which the left or reference face of a workpiece or workpiece-part 39 may be brought to bear for locating it. The reference surface 38 is disposed beneath an overhanging portion of the block 36, and to such overhanging portion, there is integrally secured a rearwardly extending arm 40, the left face 41 of which comprises a second reference surface which faces away from the reference point, and which is directed to be engaged by the workpiece-engaging surface 21 of the finger 20 of the workpiece-locating stop 18. The reference surfaces 38 and 41 are coplanar, and are always disposed in displaced relation to the reference point of the machine tool by a distance corresponding to the indication on the scale 16 where such coplanar reference surfaces intersect such scale 16.

This distance from the reference point is more accurately read by adding to the indicium 33 appearing in the window 34 the value indicated by the direct reading gage or dial indicator 25. To this end, the direct reading gage 25 has a body 47 which is secured to the upper surface of the slide bar 24. The direct reading gage 25 has a movable spindle 42 which is engageable with an adjustably supported anvil 43 carried by the holder 23.

Once the holder 23 has been properly seated on the elongated rigid means 12, the slide bar 24 may be moved to the right until the dial indicator reading has been reduced to the desired value. Note on FIGURE 2, that the dial has a calibration which is reversed from that normally expected. Such joint movement of the slide bar 24 and the direct reading gage 25 to the right is opposed by a spring 44 which acts between the holder 23 and the slide bar 24. To this end, the spring 44 comprises a spiral strip rotatably supported on a pin 45 carried by the holder 23 and having an end 46 secured with the body 47 on the direct reading gage 25 to the slide bar 24. Movement of the slide bar 24 to the right unwinds the spring 44, and when the slide bar 24 is released, the spiral spring 44 recoils of itself to return the slide bar 24 to the left to a basic position where the coplanar reference surfaces 38, 41 lie in a plane which intersects one of the main graduations of the scale 16.

A pin 48 and a screw 49 lie beneath the slide bar 24 and provide vertical support for it. The screw 49 serves with a portion of the holder 23 to provide a clamp means for holding the slide bar 24 in any selected position, loosening of the screw 49 enabling the spring 44 to return the slide bar 24 as described. However, if the arm 40 is then in engagement with the reference surface of a finger 20, the spring 44 acts through the slide bar 24 and the reference surface 41 to bias the finger 20 in a direction which takes up all play or clearance therein, such direction being that direction in which the finger is nomally subsequently engaged by the workpiece, whereby any error created by such clearance is canceled.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A structure for positioning a part with respect to a predetermined reference point, comprising in combination:
   (a) an elongated rigid means having a series of aligned locating holes spaced predetermined distances from said reference point, and also having a series of spaced threaded holes;
   (b) a holder having a locating plug receivable in any one of said locating holes, and supported by a holder portion overlying said rigid means;
   (c) a thumbscrew extending through said overlying holder portion and received in one of said threaded holes for locking said holder in a fixed position;
   (d) a movable slide bar guided by said holder and having a reference surface engageable by the part to be positioned; and
   (e) a direct reading gage coactive with said holder and said slide bar for indicating the distance that said reference surface is disposed from a basic position.

2. A structure for positioning a part with respect to a predetermined reference point, comprising in combination:
   (a) an elongated rigid means having a series of aligned locating holes spaced predetermined distances from said reference point;
   (b) a rigid rail bar secured in parallel spaced axially fixed relation to said elongated rigid means;
   (c) a workpiece-locating stop slidably supported on only said rail bar and clampable thereto, said stop including a finger part having a workpiece-engaging surface extending perpendicularly to said rail bar;
   (d) a holder having a locating plug receivable in any one of said locating holes;
   (e) a movable slide bar guided only by said holder and having a reference surface engageable by said workpiece-engaging surface of said finger; and
   (f) a direct reading gage coactive with said holder and said slide bar for indicating the distance that said workpiece-engaging surface is disposed from a basic position.

3. A structure for positioning a part with respect to a predetermined reference point, comprising in combination:
   (a) an elongated rigid means having a series of aligned locating holes spaced predetermined distances from said reference point;
   (b) a rigid rail bar secured in parallel spaced axially fixed relation to said elongated rigid means;
   (c) a workpiece-locating stop slidably supported on only said rail bar and clampable thereto, said stop including a finger part having a workpiece-engaging surface extending perpendicularly to said rail bar;
   (d) a holder having a locating plug receivable in any one of said locating holes;
   (e) an elongated longitudinally slidable bar extending along and directly guided only by said holder for free sliding movement in the direction of its length, said bar having a central portion exposed centrally of said holder, and having a reference surface engageable by said workpiece-engaging surface of said finger; and (f) a direct reading dial indicator gage having a housing secured to said central exposed portion of said slidable bar and having a spindle engaging said holder for indicating the distance that said workpiece-engaging surface is disposed from a basic position.

4. A structure for positioning a part with respect to a predetermined reference point, comprising in combination:
   (a) an elongated rigid means having a series of aligned locating holes spaced predetermined distances from said reference point;
   (b) a rigid rail bar secured in parallel spaced axially fixed relation to said elongated rigid means;
   (c) a workpiece-locating stop slidably supported on only said rail bar and clampable thereto, said stop including a finger part having a workpiece-engaging surface extending perpendicularly to said rail bar;
   (d) a one-piece holder having a fixed locating plug receivable in any one of said locating holes;
   (e) an elongated longitudinally slidable bar supported by and directly guided only by said one-piece holder for free sliding movement in the direction of its length, said bar having a central portion exposed centrally of said one-piece holder, and having a reference surface engageable by said workpiece-engaging surface of said finger; and
   (f) a direct reading dial indicator gage having a housing secured to said central exposed portion of said slidable bar and having a spindle engaging said one-piece holder for indicating the distance that said workpiece-engaging surface is disposed from a basic position.

5. A structure for positioning a part with respect to a predetermined reference point, comprising in combination:
   (a) an elongated rigid means having a series of aligned locating holes spaced predetermined distances from said reference point;
   (b) a rigid rail bar secured in parallel spaced axially fixed relation to said elongated rigid means;
   (c) a workpiece-locating stop slidably supported on only said rail bar and clampable thereto, said stop including a vertically movable finger having a workpiece-engaging surface extending perpendicularly to said rail bar;
   (d) a holder having a locating plug receivable in any one of said locating holes;
   (e) a movable slide bar guided only by said holder and having a reference surface engageable by said workpiece-engaging surface of said finger;
   (f) a spring acting between said slide bar and said holder and operative to bias said reference surface on said slide bar against said workpiece-engaging surface of said finger with such force as to simulate engagement thereof by a workpiece; and
   (g) a direct reading gage coactive with said holder and said slide bar for indicating the distance that said workpiece-engaging surface is disposed from a basic position.

6. A positioning structure as claimed in claim 5, in which said spring has a spiral configuration and is rotatably supported by said holder, said spring having an end portion secured to said slide bar.

7. A positioning structure as claimed in claim 6 in which said holder has an elongated recess in which said slide bar is disposed, said spring being disposed at one end of said elongated recess, and its said end portion extending along the length of said recess.

8. A structure for positioning a part with respect to a predetermined reference point, comprising in combination:
   (a) an elongated rigid means having a series of aligned locating holes spaced predetermined distances from said reference point;
   (b) a rigid rail bar secured in parallel spaced relation to said elongated rigid means;
   (c) a workpiece-locating stop assembly slidably supported on said rail bar and clampable thereto, said stop assembly including a finger part having a workpiece-engaging surface extending perpendicularly to said rail bar, said finger part being movable in a direction parallel to said surface;
   (d) a holder having a locating plug receivable in any one of said locating holes;
   (e) a movable slide bar guided by said holder and having a reference surface engageable by said workpiece-engaging surface of said finger;
   (f) a spring acting between said slide bar and said holder and operative through said reference surface on said finger part to take up any play in said stop assembly in the direction that said finger part is to be engaged by the workpiece; and
   (g) a direct reading gage coactive with said holder and said slide bar for indicating the distance that said workpiece-engaging surface is disposed from a basic position.

9. A structure for positioning parts with respect to a predetermined reference point, comprising in combination:
   (a) an elongated rigid means having a series of aligned locating holes spaced predetermined distances from said reference point, and also having a series of spaced threaded holes;
   (b) a series of indicia on said rigid means for identifying basic distances;
   (c) a rigid rail bar secured in parallel spaced relation to said elongated rigid means;
   (d) a workpiece-locating stop slidable on said rail bar and clampable thereto, said stop including a finger part having a workpiece-engaging surface extending perpendicularly to said rail bar;
   (e) a holder having a locating plug receivable in any one of said locating holes, said holder having a masking portion supporting said plug and overlying a plurality of said indicia, and means in said masking portion defining a window exposing the indicium associated with said one locating hole;
   (f) a thumbscrew extending through said overlying holder portion and received in one of said threaded holes for locking said holder in a fixed position;
   (g) an elongated movable slide bar guided by means defining a channel in said holder, and having ends extending therebeyond, one of said slide bar ends having a first reference surface directed toward the reference point engageable by a workpiece-part to be positioned, and a second reference surface directed away from the reference point engageable by said workpiece-part engaging surface of said finger part, said reference surfaces being coplanar;
   (h) a spring normally having a spiral configuration rotatably supported on said holder, and having an end secured to said slide bar, said spring being operative, when unwound by movement of the slide bar, to take up any play in said finger part in the direction that said finger part is to be engaged by the workpiece-part, and to return said slide bar by rewinding of itself;
   (i) a direct reading gage having a body secured to and supported by said slide bar for movement therewith, and having a spindle engageable with said holder, said gage being operative to indicate with said exposed indicium the distance from said reference surfaces to said reference point; and
   (j) clamp means operative on said slide bar for selectively locking it in any position.

(References on following page)

References Cited by the Examiner

UNITED STATES PATENTS

| | | | |
|---|---|---|---|
| 761,328 | 5/1904 | Spalding | 33—165 |
| 914,855 | 3/1909 | Mastrangel. | |
| 1,502,806 | 7/1924 | Berg | 33—165 |
| 2,400,715 | 5/1946 | Sandberg | 33—170 |
| 2,421,440 | 6/1947 | Thorpe. | |
| 2,617,199 | 11/1952 | Samotey | 33—170 |
| 2,926,426 | 3/1960 | Lury | 33—170 X |
| 2,941,303 | 6/1960 | Middlestadt | 33—174 |
| 3,115,708 | 12/1963 | Roy. | |

FOREIGN PATENTS

| | | |
|---|---|---|
| 872,078 | 1/1942 | France. |
| 885,588 | 5/1943 | France. |
| 588,559 | 5/1947 | Great Britain. |
| 566,275 | 7/1957 | Italy. |
| 229,451 | 1/1944 | Switzerland. |

OTHER REFERENCES

"Spring Motor," Review of Scientific Instruments, October 1950, volume 25, No. 10, pages 888–889.

ROBERT B. HULL, *Primary Examiner.*